Jan. 24, 1928.
D. J. MILOSEVICH
1,657,022
APPARATUS FOR CURING CONCRETE PIPE AND THE LIKE
Filed Sept. 1, 1926   2 Sheets-Sheet 2
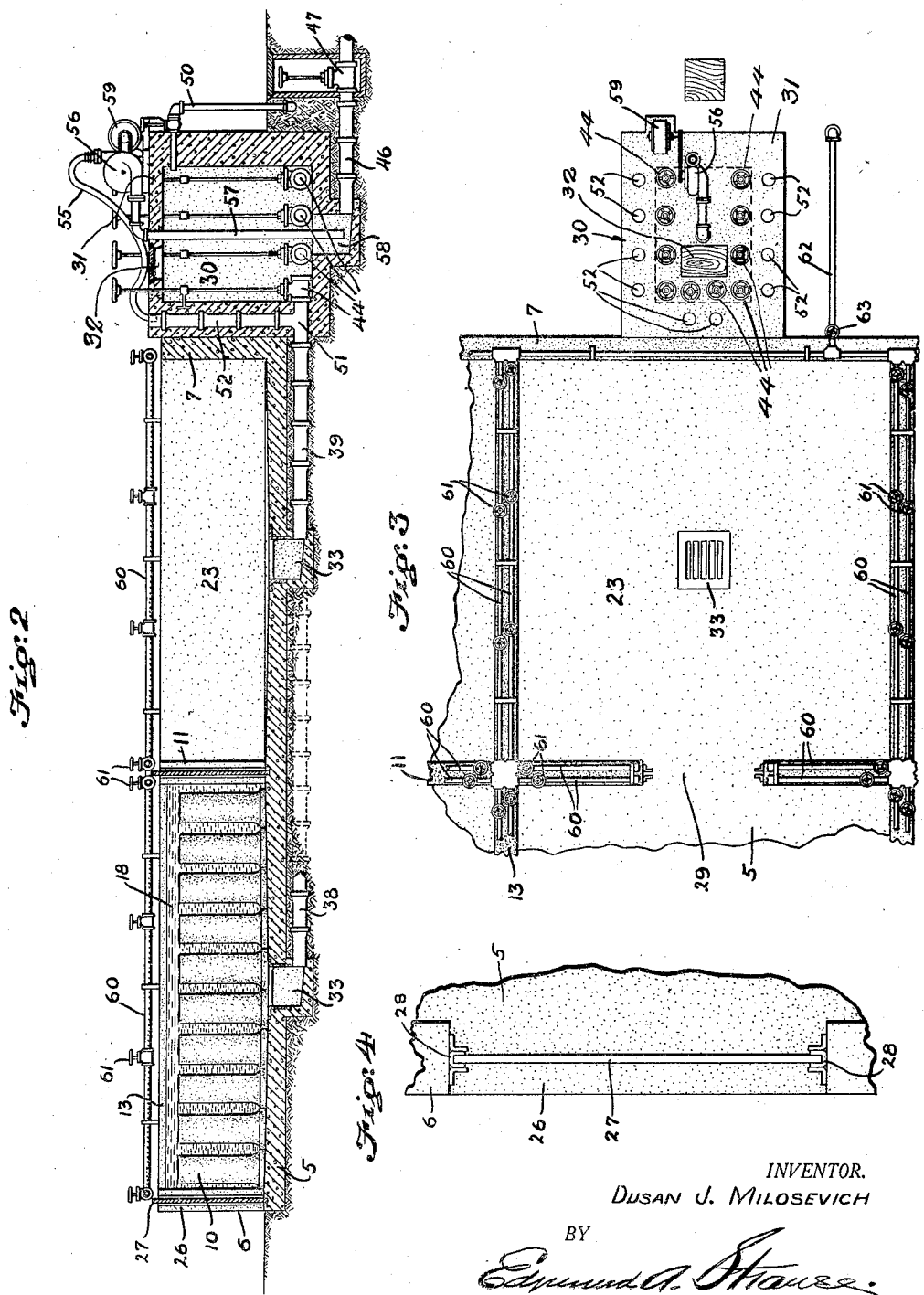
INVENTOR.
DUSAN J. MILOSEVICH
BY
ATTORNEY.

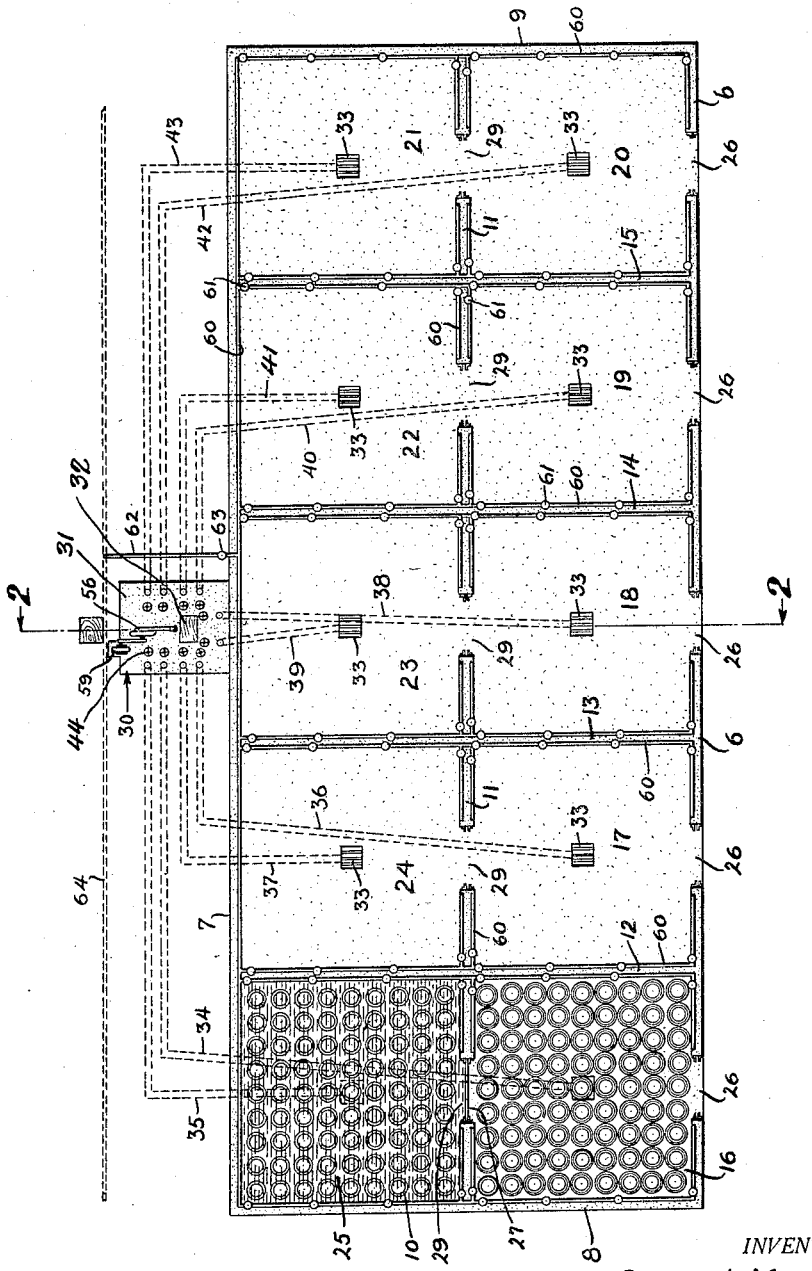

Patented Jan. 24, 1928.

1,657,022

UNITED STATES PATENT OFFICE.

DUSAN J. MILOSEVICH, OF LOS ANGELES, CALIFORNIA.

APPARATUS FOR CURING CONCRETE PIPE AND THE LIKE.

Application filed September 1, 1926. Serial No. 133,024.

This invention relates more particularly to a fluid tank construction for curing or hardening concrete objects, such as, drain or sewer pipe.

A general object of this invention is to provide a fluid tank construction divided into a plurality of compartments for the reception, submersion and cure of newly formed concrete pipe sections, provision being made for transferring the fluid from an occupied compartment to an unoccupied one as the pipe are cured, whereby to permit of a removal of the cured pipe and to effect a substantial saving in the use of water.

A further object is to provide a sprinkler system in connection with the apparatus, whereby the "green" pipe sections may be effectively moistened during their placement in the tank compartments in order to prevent premature drying of said sections before water is admitted to the compartment A still further object is to provide an apparatus that will greatly economize in the use of water during the pipe curing process.

Briefly, the invention consists of a rectangular walled structure open at its top, arranged in a series of compartments arranged in pairs, each pair communicating with each other and having an opening from the outside controlled by gate slides. Suitable drain pipes connect the various compartments with each other in order to equalize by gravity flow the water in a pair of filled compartments with a pair of unfilled ones when it is desired to remove the cured pipe sections therefrom, a pumping means connected to valved pipe lines being provided to completely remove the remaining portion of the water from the filled compartment to the unoccupied one so that the cured pipe may be removed therefrom. By transferring the water from one compartment to another and using the same over and over again for curing newly formed pipe great economy is effected in the use of water over the spraying systems now generally employed, besides effecting a perfect "cure" of the pipes.

The above and other objects are accomplished by means of the apparatus disclosed herein, and illustrated in the accompanying drawings, in which:

Fig. 1 is a plan view of the apparatus showing a pair of compartments filled with pipe sections, one being filled with water.

Fig. 2 is a transverse section on an enlarged scale taken on line 2—2 of Fig. 1.

Fig. 3 is greatly enlarged plan view of the compartment adjacent the valve control and pumping means.

Fig. 4 is a detail plan view of the gate control between the compartments.

In the manufacture of concrete drain and sewer pipe sections it has been customary to moisten the same by means of a sprinkler system which has not proven altogether satisfactory, mainly for the reason that a proper cure of the pipe sections are not effected, some of the pipes receiving more water than the others, and further as it is not practicable to operate the sprinkling system at night without an attendant the pipe frequently "dry out" especially if the nights are hot, or windy. By the employment of the novel curing apparatus hereinafter described the newly formed pipe sections are maintained continuously in a submerged condition until a perfect "cure" has been effected.

Referring now more specifically to the accompanying drawings the tank construction preferably consists of a concrete floor foundation 5 of rectangular form having at its edge portions vertically extending side walls 6, 7, and end walls 8, 9, all formed of concrete and reinforced if desired. These walls are of a height somewhat greater than the length of the concrete pipe sections 10 that are to be placed within for "curing" after their formation by suitable apparatus (not shown). Tank 5 is divided longitudinally at the center thereof with a partition wall 11 and transversely divided in equal proportions by other partition walls 12, 13, 14 and 15 forming a series of compartments 16, 17, 18, 19, 20, 21, 22, 23, 24 and 25 for the reception of the pipe sections. Compartments 16 to 20 inclusive have openings 26 formed in the side wall 6 of the tank closed by slide gates 27 whose vertical edges are provided with a waterproof packing 28 designed to seal the gates against leakage when the compartments are filled with water. Partition wall 11 is also provided with openings 29 closed by similar gates, these openings being designed to provide access to the compartments 21 to 25 inclusive for the placement of pipe sections therein.

The water supply for the compartments is preferably provided by pipe lines controlled by a plurality of gate valves, all mounted for convenient manipulation in a concrete tank or well 30, erected mid-way between the ends of tank wall 7, its walls being substantially of the same height as the tank walls, its upper end being provided with a cover wall 31 having a man-hole 32 for convenient access thereto.

Each compartment is provided with a drain well 33 covered with an iron grating, and extending from each well are pipe lines 34, 35, 36, 37, 38, 39, 40, 41 and 42, all leading to and terminating within the well 30. The ends of the various pipe lines are controlled by gate valves 44, the valve operating handles extending upwardly and through the cover wall of the well in convenient reach of the operator. By means of these pipe lines water is supplied to or removed from the various compartments at the will of the operator, as will be more fully described hereinafter.

Well 30 is provided in its floor with a small well 58 whose bottom floor is disposed a suitable distance below the horizontally disposed pipe lines in order to effect a gravity flow therefrom, and a water outlet pipe 46 leads therefrom controlled by a valve 47 for the purpose of draining the water from all of the compartments when it is desired to cleanse or repair the pipe lines. Water is supplied to well 30 from a valved inlet pipe line 50 connected to a source of supply not shown.

The valved end of each pipe line leading from the compartments has a T fitting 51, see Fig. 2, and extending vertically therefrom in the side and one of the end walls of the well 30 are stand pipe lines 52, see Figs. 2 and 3, for the purpose of transferring water from filled to unfilled compartments during the operation of curing pipe sections.

The operation of the apparatus will be readily understood from the following. When compartment 25 has been filled with newly formed pipe sections, the opening 29 between compartments 16 and 25 is closed by its slide gate, and then compartment 16 is similarly filled and its opening 26 closed by its slide gate. All the valves in well 30 are now closed with the exception of the valves controlling the pipe lines 34, 35, leading to the filled compartments 16, 25. The inlet valve controlling inlet pipe line 50 is then opened the water flowing into the well 30, and thence through pipe lines 34, 35, into the compartments 16, 25. As the well is closed at its upper end it will be clear that the water will be forced into the compartments until the same are substantially filled, when the valves of pipe line 34, and 35 are closed. The remaining unoccupied compartments may be filled with water in a similar manner as the completed pipe sections are disposed therein. It will be understood that at least two adjacent compartments are always empty to provide for the transfer of water from a pair of filled compartments after a "cure" of the submerged pipes therein have been effected.

When all the compartments except the last two end ones 20, 21, have been filled with pipe section and water has been supplied thereto as heretofore described, the manner of water transference from compartments 16, 25, to the empty compartments 20, 21 is as follows.

Valves controlling drain pipe lines 34, 35, 42, and 43 are opened, the water from compartments 16, 25, draining therefrom to the well 30; and thence through lines 42, 43 into the empty compartments 20 and 21, the gate to opening having been first closed. When the water in the four compartments has been equalized, then the valves of pipe lines 42, 43 are closed and a hose 55 leading from a pump 56 of an approved design connected by a pipe line 57 leading downwardly therefrom and terminating adjacent the bottom of the pump well 58 is inserted alternatively in the stand pipes of lines 42, 43, and the water in the well is pumped into the compartments 20, 21, it being understood that the valves of pipe lines 34, 35, are open to allow of a complete drainage of compartments 16 and 25. When the transfer of water is completed the operator closes the valves of pipe lines 34, 35, the gates of openings 16, 29 are removed and the cured pipe sections are then removed from the compartments to a convenient place of storage. Exactly similar proceedings are performed with respect to the other pair of compartments, the pipe sections remaining completely submerged for a definite period of time sufficient to effect a perfect cure.

Each compartment is designed to hold approximately one hundred sections of pipe, and as the "green" pipe tends to dry quickly it is evident that moisture should be supplied during the time the placements are being made. To this end on the upper ends of the walls 6, 7, as well as the partition walls are secured in a suitable manner a plurality of perforated sprinkler pipes 60, controlled by valves 61, said pipe lines leading from a water supply pipe 62, controlled by a valve 63, to a main supply pipe line 64. As the compartments are partially filled with freshly formed pipe sections the sprinkler pipes 60 are opened to moisten the pipes prior to their complete submersion, thus preventing a premature cure.

From the above description it will be apparent that by means of my apparatus sections of freshly made concrete pipe may be conveniently disposed by the workmen in the various compartments as soon as the same are finished, and as each compartment is filled the gates are closed and water admitted thereto, the sections curing while the remaining compartments are being filled. When all the compartments have been filled, the water in the first filled compartments can be quickly pumped to the empty compartments 20, and 21, and the cured pipe removed therefrom, the operations above described being continuous. As the water is continually transferred from one compartment to another little or no wastage will occur beyond that absorbed by the pipe sections and natural evaporation.

What I claim is:

1. An apparatus for curing concrete pipe and the like comprising a fluid tank structure open at its upper end divided into a plurality of compartments, a fluid well, valve controlled pipe line drains leading from each compartment to said fluid well, a fluid supply pipe leading to said well, and means to transfer the fluid from one filled compartment to an empty one.

2. An apparatus for curing concrete pipe and the like comprising a fluid holding tank open at its upper end divided into a plurality of compartments, and means to transfer fluid from one of said compartments to another.

3. An apparatus for curing concrete pipe and the like comprising a fluid holding tank open at its upper end provided with a plurality of compartments, and a pumping mechanism for tranferring fluid from a filled compartment to an empty one.

4. An apparatus for curing concrete pipe and the like comprising a fluid holding tank open at its upper end divided into a plurality of compartments, means to supply fluid to any one or a number of said compartments simultaneously, and means to transfer fluid from some of said filled compartments to other empty compartments.

5. An apparatus for curing concrete pipe and the like comprising a fluid holding tank open at its upper end divided into a plurality of compartments, a wall of each compartment having an entrance opening and closures therefore, and a pumping means for transferring water from one of said compartments to another.

6. An apparatus for curing concrete pipe and the like comprising a fluid holding tank open at its upper end divided into a plurality of compartments, a fluid holding structure adjacent said tank, pipe lines leading from each compartment to said fluid holding structure, valves for controlling said pipe lines, a branch pipe line leading to each of said first mentioned pipe lines, and a pumping means adapted to be connected to any one of said branch pipe lines for transferring fluid from one compartment to another.

7. An apparatus for curing concrete pipe and the like comprising a fluid holding tank open at its upper end divided into a plurality of compartments, means to transfer fluid from one compartment to another, and a fluid spraying means connected to said tank for spraying articles stored in said compartments.

8. An apparatus for curing objects formed from concrete comprising a walled structure open at its upper end and provided with a plurality of fluid compartments, and a fluid spraying means mounted on the upper end of the structure walls for directing fluid sprays on objects disposed in said compartments.

9. An apparatus for curing objects formed from concrete comprising a rectangular walled structure open at its upper end and divided by partitions into a plurality of compartments arranged in communicating pairs, closure means for controlling communications between each pair, and means to supply fluid to said compartments.

10. An apparatus for curing objects formed from concrete comprising a walled structure open at its upper end and divided by walled partitions into a plurality of fluid compartments, a walled structure disposed adjacent one of the walls of said structure forming a fluid supply well, said well being connected to a source of fluid supply, and pumping means connected to said well for controlling the supply of fluid to said compartments.

In witness that I claim the foregoing I have hereunto subscribed my name this 13th day of August, 1926.

DUSAN J. MILOSEVICH.